(12) United States Patent
Griffin et al.

(10) Patent No.: US 8,456,177 B2
(45) Date of Patent: Jun. 4, 2013

(54) SYSTEM AND METHOD OF OCCUPANT DETECTION WITH A RESONANT FREQUENCY

(75) Inventors: Dennis P. Griffin, Noblesville, IN (US); Mark C. Hansen, Kokomo, IN (US)

(73) Assignee: Delphi Technologies, Inc., Troy, MI (US)

( * ) Notice: Subject to any disclaimer, the term of this patent is extended or adjusted under 35 U.S.C. 154(b) by 0 days.

(21) Appl. No.: 13/568,201

(22) Filed: Aug. 7, 2012

(65) Prior Publication Data

US 2012/0319701 A1 Dec. 20, 2012

Related U.S. Application Data

(63) Continuation of application No. 12/633,019, filed on Dec. 8, 2009, now abandoned.

(51) Int. Cl.
*G01R 27/04* (2006.01)
*G01R 27/32* (2006.01)

(52) U.S. Cl.
USPC ........... 324/633; 324/634; 324/635; 324/661; 324/662; 324/663; 324/664; 324/667; 324/668; 324/674; 324/675; 324/681; 324/682; 324/666; 180/274; 180/282; 280/735; 340/457.1; 340/573.1; 340/666; 340/667

(58) Field of Classification Search
USPC .................. 324/633–635, 661–664, 667, 668, 324/674, 675, 681, 682, 686; 180/274, 282; 280/735; 340/457.1, 573.1, 666, 667
See application file for complete search history.

(56) References Cited

U.S. PATENT DOCUMENTS

| | | | |
|---|---|---|---|
| 3,836,790 A | | 9/1974 | Becker |
| 3,988,541 A | | 10/1976 | Boast |
| 4,491,784 A | * | 1/1985 | Flora et al. ................... 324/668 |
| 5,309,377 A | | 5/1994 | Beebe |
| 5,741,994 A | * | 4/1998 | Takeuchi ........................ 84/660 |
| 5,914,610 A | | 6/1999 | Gershenfeld et al. |
| 5,991,234 A | * | 11/1999 | Sejalon et al. .................. 367/13 |
| 6,025,725 A | | 2/2000 | Gershenfeld et al. |
| 6,161,070 A | | 12/2000 | Jinno et al. |
| 6,179,378 B1 | | 1/2001 | Baumgartner et al. |
| 6,434,451 B1 | * | 8/2002 | Lohberg et al. .................... 701/1 |
| 6,556,137 B1 | | 4/2003 | Oka et al. |
| 6,559,555 B1 | | 5/2003 | Saitou et al. |
| 6,563,761 B1 | * | 5/2003 | Schaffran et al. ............. 367/101 |

(Continued)

FOREIGN PATENT DOCUMENTS

WO W09513204 5/1995

*Primary Examiner* — Patrick Assouad
*Assistant Examiner* — Lamarr Brown
(74) *Attorney, Agent, or Firm* — Lawrence D. Hazelton

(57) ABSTRACT

An occupant detection system that includes an electrode arranged proximate to an expected location of an occupant for generating an electric field between the electrode and the occupant proximate thereto. An electrical network coupled to the electrode forms a resonant circuit that includes the occupant as part of the resonant circuit. A controller coupled to the resonant circuit is configured to determine a resonant frequency of the resonant circuit indicative of an occupant presence, and a network signal magnitude at the resonant frequency indicative of a humidity value proximate to the electrode. 7. A method for detecting a vehicle applies an excitation signal to the resonant circuit, determine a resonant frequency of the resonant circuit and determines a humidity value based on a network signal magnitude at the resonant frequency.

8 Claims, 4 Drawing Sheets

U.S. PATENT DOCUMENTS

| | | | |
|---|---|---|---|
| 6,644,689 B2 | 11/2003 | Murphy | |
| 6,696,948 B2 | 2/2004 | Thompson et al. | |
| 6,810,984 B2 | 11/2004 | Sakai et al. | |
| 6,816,077 B1 | 11/2004 | Shieh et al. | |
| 6,877,606 B2 | 4/2005 | Hardy | |
| 6,927,678 B2 * | 8/2005 | Fultz et al. | 340/438 |
| 6,960,841 B2 | 11/2005 | Saitou et al. | |
| 6,999,301 B1 | 2/2006 | Sanftleben et al. | |
| 7,027,767 B2 | 4/2006 | Chapelle et al. | |
| 7,048,338 B2 | 5/2006 | Pinkos | |
| 7,084,763 B2 | 8/2006 | Shieh et al. | |
| 7,102,527 B2 | 9/2006 | Shieh et al. | |
| 7,119,705 B2 * | 10/2006 | Manlove et al. | 340/667 |
| 7,129,713 B2 * | 10/2006 | Katz | 324/664 |
| 7,151,452 B2 | 12/2006 | Shieh | |
| 7,176,390 B2 * | 2/2007 | Hansen et al. | 177/136 |
| 7,194,346 B2 | 3/2007 | Griffin et al. | |
| 7,271,730 B2 | 9/2007 | Kimura et al. | |
| 7,384,066 B2 * | 6/2008 | Griffin et al. | 280/735 |
| 7,434,481 B2 | 10/2008 | Hawes et al. | |
| 7,436,299 B2 | 10/2008 | Shieh et al. | |
| 7,463,161 B2 * | 12/2008 | Griffin et al. | 340/667 |
| 7,514,917 B2 | 4/2009 | Cech et al. | |
| 7,523,803 B2 | 4/2009 | Breed | |
| 7,657,354 B2 | 2/2010 | Breed et al. | |
| 7,688,204 B2 | 3/2010 | Yamanaka et al. | |
| 7,830,267 B2 * | 11/2010 | Veerasamy | 340/602 |
| 7,876,106 B2 * | 1/2011 | Hansen et al. | 324/681 |
| 7,880,480 B2 * | 2/2011 | Hansen | 324/681 |
| 7,973,674 B2 | 7/2011 | Bell et al. | |
| 7,976,060 B2 * | 7/2011 | Breed | 280/735 |
| 8,040,241 B2 | 10/2011 | Kamizono et al. | |
| 8,091,960 B2 | 1/2012 | Kincaid et al. | |
| 8,154,394 B2 | 4/2012 | Hansen | |
| 8,237,455 B2 * | 8/2012 | Griffin | 324/681 |
| 2003/0209094 A1 * | 11/2003 | Takeuchi et al. | 73/865 |
| 2005/0038586 A1 * | 2/2005 | Griffin et al. | 701/45 |
| 2005/0151053 A1 * | 7/2005 | Griffin et al. | 250/206 |
| 2006/0092032 A1 * | 5/2006 | Manlove et al. | 340/667 |
| 2006/0097780 A1 * | 5/2006 | Griffin et al. | 329/313 |
| 2006/0187038 A1 * | 8/2006 | Shieh et al. | 340/562 |
| 2006/0283651 A1 * | 12/2006 | Fultz et al. | 180/272 |
| 2007/0120347 A1 * | 5/2007 | Breed et al. | 280/735 |
| 2008/0142713 A1 * | 6/2008 | Breed et al. | 250/330 |
| 2008/0184804 A1 * | 8/2008 | Leverrier et al. | 73/702 |
| 2008/0314149 A1 * | 12/2008 | Rueger | 73/579 |
| 2009/0160461 A1 * | 6/2009 | Zangl et al. | 324/684 |
| 2009/0267622 A1 | 10/2009 | Hansen et al. | |
| 2009/0271076 A1 | 10/2009 | Griffin | |
| 2009/0295411 A1 * | 12/2009 | Hansen | 324/681 |
| 2009/0295412 A1 * | 12/2009 | Griffin | 324/681 |
| 2009/0295554 A1 * | 12/2009 | Hansen | 340/425.5 |
| 2011/0121996 A1 * | 5/2011 | Griffin et al. | 340/943 |
| 2011/0133755 A1 * | 6/2011 | Griffin et al. | 324/633 |
| 2011/0241895 A1 * | 10/2011 | Griffin | 340/686.1 |
| 2011/0307148 A1 * | 12/2011 | Griffin et al. | 701/45 |
| 2012/0105241 A1 * | 5/2012 | Griffin et al. | 340/667 |
| 2012/0187959 A1 * | 7/2012 | Lin | 324/633 |

* cited by examiner

SYSTEM AND METHOD OF OCCUPANT DETECTION WITH A RESONANT FREQUENCY

CROSS-REFERENCE TO RELATED APPLICATION

This application is a continuation of U.S. Ser. No. 12/633,019, filed by Dennis P. Griffin on Dec. 8, 2009, entitled "SYSTEM AND METHOD OF OCCUPANT DETECTION WITH A RESONANT FREQUENCY", the entire contents of which are incorporated by reference herein.

TECHNICAL FIELD OF INVENTION

The invention generally relates to vehicle passenger occupant detection, and more particularly relates to a system and method for detecting an occupant on a vehicle seat that includes an electrode coupled to an electrical network configured to have a resonant frequency that is dependent on presence of the occupant, and a signal magnitude at the resonant frequency indicative of a humidity level.

BACKGROUND OF INVENTION

It is known to selectively enable or disable a vehicle air bag or other occupant protection device based on the presence of an occupant in a seat. It has been proposed to place electrically conductive material in a vehicle seat to serve as an electrode for detecting the presence of an occupant in the seat. For example, U.S. Patent Application Publication No. 2009/0267622 A1, which is hereby incorporated herein by reference, describes an occupant detector for a vehicle seat assembly that includes an occupant sensing circuit that measures the impedance of an electric field generated by applying an electric signal to the electrode in the seat. The presence of an occupant affects the electric field impedance about the electrode that is measured by the occupant sensing circuit. However, environmental conditions such as humidity or moisture may interfere with the accuracy of measuring the electric field impedance. Furthermore, such measurements may become unreliable or unusable if liquid is present on or in the seat such as due to a wet bathing suit or due a window being left open during a rain shower. What is needed is a system that can determine the presence of an occupant in a seat having an electrode that is not adversely or unacceptably sensitive to varying humidity levels and can sense when a seat is wet.

SUMMARY OF THE INVENTION

In accordance with one aspect of this invention, an occupant detection system includes an electrode, an electrical network, and a controller. The electrode is arranged proximate to an expected location of an occupant for generating an electric field between the electrode and the occupant proximate thereto. The electrical network is coupled to the electrode to form a resonant circuit that includes the occupant as part of the resonant circuit. The controller is coupled to the resonant circuit. The controller is configured to determine a resonant frequency of the resonant circuit indicative of an occupant presence, and a network signal magnitude at the resonant frequency indicative of a humidity value proximate to the electrode.

In another aspect, a method for detecting a vehicle occupant includes the step of applying an excitation signal to a resonant circuit that includes the occupant as part of the resonant circuit, said excitation signal having an excitation frequency. The method also includes the step of detecting a network signal arising in response to the excitation signal, said network signal having a network signal magnitude. The method also includes the step of determining a resonant frequency corresponding to the excitation frequency that causes a peak network signal magnitude. The method also includes the step of determining a humidity value based on the network signal magnitude at the resonant frequency.

Further features and advantages of the invention will appear more clearly on a reading of the following detail description of the preferred embodiment of the invention, which is given by way of non-limiting example only and with reference to the accompanying drawings.

BRIEF DESCRIPTION OF DRAWINGS

The present invention will now be described, by way of example with reference to the accompanying drawings, in which.

DETAILED DESCRIPTION OF INVENTION

Figure 1:
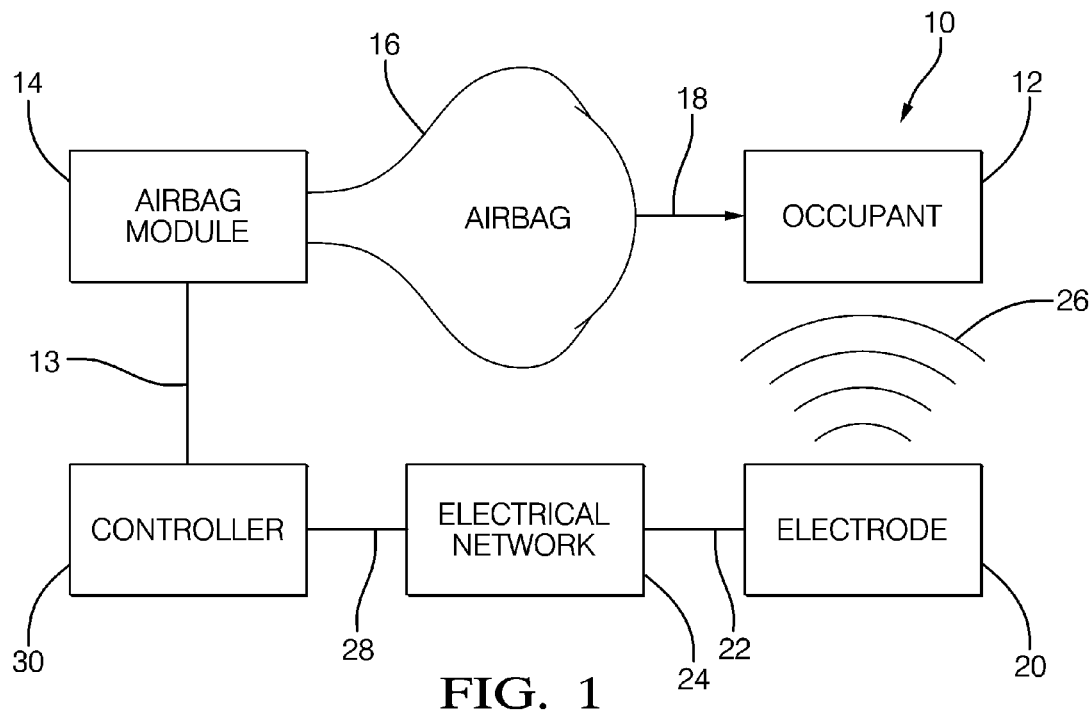
FIG. 1 block diagram of an occupant detection system, according to one embodiment.

In accordance with an embodiment of an occupant detector, FIG. 1 illustrates an occupant detection system 10 for detecting the presence of an occupant 12. Determining an occupant presence in a vehicle seat is useful for controlling various vehicle features such as enabling or disabling an air bag module 14 in the vehicle according to one embodiment. An air bag module 14 deploys an air bag 16 to restrain the occupant 12 in the event of a vehicle collision, as indicated by an arrow 18. It is advantageous to disable the air bag module 14 if the vehicle seat is empty so the air bag 16 is not unnecessarily deployed. Determining an occupant presence may include determining the relative size of the occupant 12 so that an air bag deployment force may be adjusted correspondingly. For example, if the occupant 12 is determined to be a small adult or a child, it may be advantageous to deploy the air bag 16 with less force than is used for a larger adult. As will be explained in more detail below, the occupant detection system 10 includes an electrode 20 that receives a network signal 22 from an electrical network 24 and generates an electric field 26 in response to the network signal 22. The network signal 22 arises from an excitation signal 28 output by a controller 30 to determine an occupant presence for determining an air bag activation signal 13 to activate the air bag module 14. The air bag module 14 receives the activation signal 13 from the controller 30 to arm the air bag module so that a signal from a collision detection system (not shown) can deploy the air bag 16. It should be appreciated that the occupant detection system 10 may be used for other vehicle functions such as activating a seat belt warning if the seat belt is not properly deployed.

Figure 2:
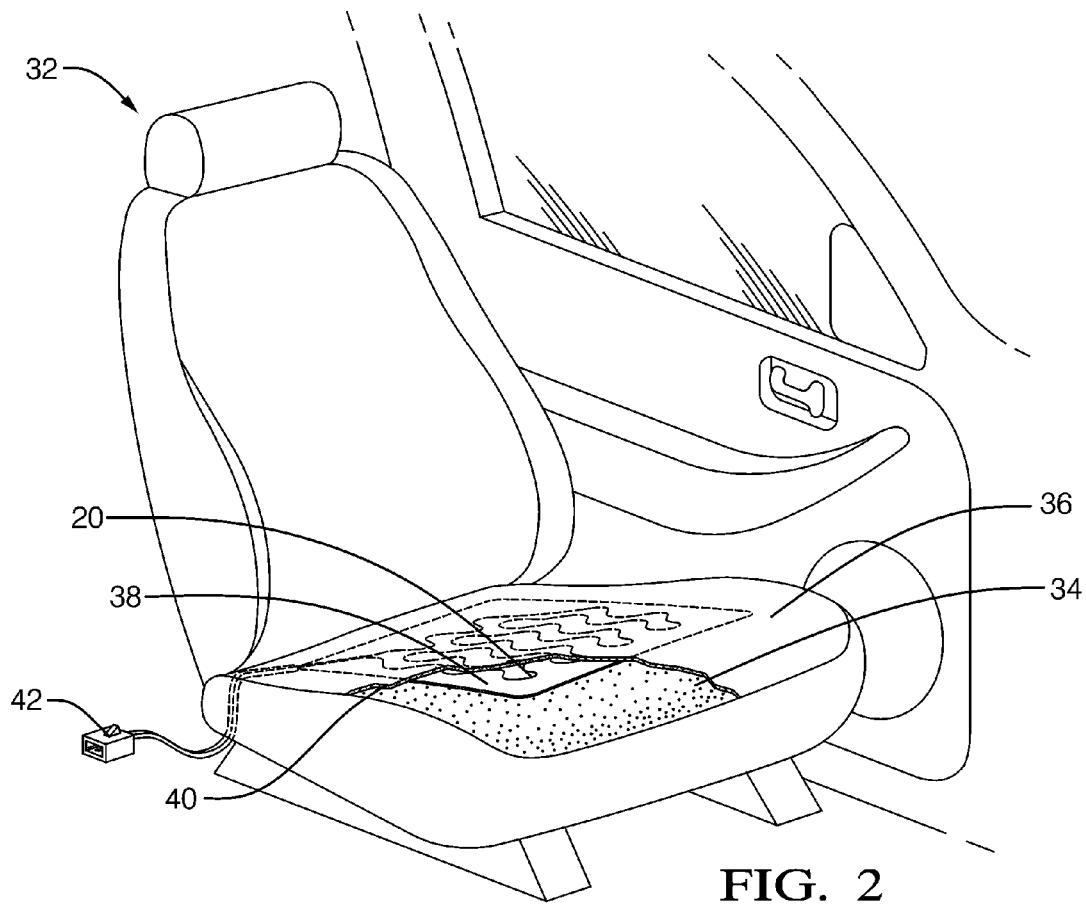
FIG. 2 is a perspective view of a seat assembly incorporating the occupant detection system shown in FIG. 1.

FIG. 2 shows an exemplary seat assembly 32 suitable for use by the occupant detection system 10 for sensing an occupant presence to detect the occupant 12 (not shown in FIG. 2) proximate to the seat assembly 32. The seat assembly 32 is illustrated in a vehicle passenger compartment according to one embodiment, but could be used in any kind of vehicle, such as an airplane. The seat assembly 32 has a seat cushion 34 for providing a seating surface 36 to support the occupant 12. Seat cushion 34 is suitably made of foam having characteristics suitable for seating use. Adjacent the seating surface 36 is a mat 38 shown with the electrode 20 in the form of a wire attached to the mat 38. The electrode 20 can be made of any electrically conductive material suitable for use adjacent the seating surface 36. Exemplary materials for forming the electrode 20 include metal wire, conductive fiber, metal foil, and metal ribbon. The cushion 34 is covered with covering 40 to protect the cushion 34 and the electrode 20, and to make the appearance of seat assembly 30 attractive. The electrode 20 is arranged to be located near or proximate to the seating surface 36. Such an arrangement improves occupant detection sensitivity and accuracy for detecting an occupant near seating surface 36 by maximizing the electrical field 26 coupling to the occupant 12. The electrode 20 is electrically coupled to a connector 42 so electrode 20 can be readily connected to the occupant detection system 10.

Figure 3:
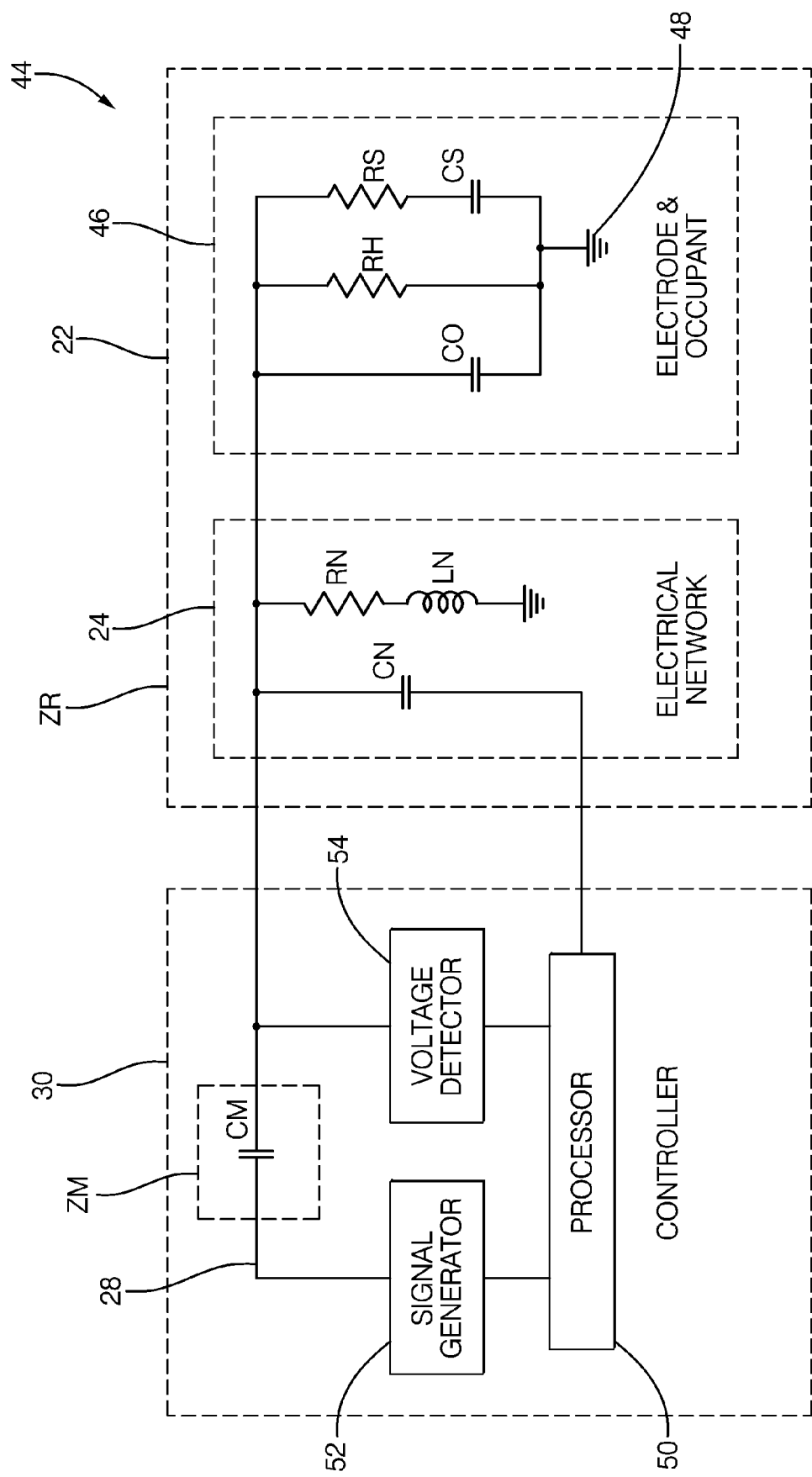
FIG. 3 is a block/circuit diagram of the occupant detection system shown in FIG. 1.

FIG. 3 shows an exemplary circuit diagram 44 for illustrating the operation of the occupant detection system 10. The circuit diagram 44 includes an electrode/occupant model 46 for illustrating the influences on an electrode impedance provided by the electrode 20. Variation in the electrode impedance is caused by the occupant 12 and other environmental factors. FIG. 3 shows a capacitor CO having a capacitance value dependent on the presence of an occupant. In general, capacitors may be characterized as two spaced apart plates having material with a dielectric constant occupying the space between the plates. The dielectric constant of the material influences the capacitance value of the capacitor. In the model 46, the electrode 20 corresponds to the plate of capacitor CO connected to network signal 22. The other plate of capacitor CO corresponds to the frame and body of the vehicle surrounding the occupant 12 and is shown connected to a reference ground 48. It follows that the dielectric constant of the material in the region between the capacitor plates is influenced at least in part by the presence or absence of the occupant 12. The presence of a large adult versus a small child, or the absence of an occupant effectively varies the model of the dielectric material between the plates and thereby varies the capacitance value of capacitor CO. As such, the electrode 20 has an electrode impedance that is indicative of occupant presence and occupant size and/or weight.

The model 46 also shows a resistor RH in parallel with capacitor CO that models a resistive path for direct current that is commonly associated with dielectric leakage of a capacitor. The value of resistor RH is dependent on the material used to make cushion 34 and seat cover 40, and on other environmental conditions such as relative humidity, temperature, or changes due to wear and breakdown of the materials used to form the seat assembly 32. Increasing humidity decreases the value of resistor RH. A wet seat due to a spilled drink, a wet bathing suit, or the seat being rain soaked because a window was left open during a rain shower may also reduce the value of resistor RH.

The electrode impedance of model 46 can be expressed as a complex value including real parts and imaginary parts. For complex values expressed in Cartesian coordinates, the real parts are based on resistor values, and the imaginary parts are based on either inductor values or capacitor values and the frequency being applied to the inductor or capacitor. The electrode impedance has an imaginary electrode capacitive part corresponding to the capacitance value of capacitor CO that is indicative of the occupant. A typical capacitance value for an empty seat assembly 32 in an automobile is about 50 pF to about 100 pF. When an adult occupies the seat assembly 32, the capacitance value typically increases about 30 pF to about 80 pF. The electrode impedance also has a real electrode resistive part corresponding to the resistance value of resistor RH that is indicative of an environmental condition. A typical resistance value for a dry seat assembly 32 is greater than 1.0 MΩ (1 million Ohms). If the humidity level is high, the resistance value may be below 1.0 MΩ. If the seat is wet due to a spilled drink for example, the resistance value may be below about 0.1 MΩ according to one embodiment. The model 46 may optionally include a series combination of a dielectric storage resistance RS and a dielectric storage capacitance CS to provide a model to compensate for effects due to dielectric storage. The model 46 may also include other parasitic elements (not shown) such an inductor and or resistor corresponding to the electrical characterizes of interconnecting devices such as connector 43. The electrode impedances for an empty seat and various sized seat occupants at various humidity levels are determined empirically for a given seat/vehicle/electrode configuration.

FIG. 3 shows an electrical network 24 coupled to the electrode/occupant model 46 electrode to form a resonant circuit having a resonant frequency. Since the electrode impedance is capacitive and provides a capacitance part, a resonant circuit may be formed if the electrical network has a network impedance that provides an inductive part. The inductive part cooperates with the capacitive part to influence the resonant frequency of the combination of electrode 20 and electrical network 24. The electrical network 24 provides the network inductive part by including an inductor LN. The resonant circuit is characterized as having a resonant frequency, and the resonant frequency is dependent on the network impedance. The electrode impedance and the network impedance combine to have a resonant circuit impedance ZR. A typical inductor has measurable series resistance. As such, a model of an inductor may optionally include a resistor RN in series with the inductor LN.

The electrical network 24 is illustrated as being formed of passive components. Alternately, the electrical network 24 may be an impedance synthesizer configured to provide an electronic load on the network signal 22 that mimics passive components such as inductor LN. Such an impedance synthesizer may vary the apparent impedance of electrical network 24 in response to a control signal from a controller 30. By using an impedance synthesizer, the resonant frequency of the resonant frequency for a given capacitive value of CO can be adjusted to a desired value.

The electrical network 24 also shows a capacitor CN that, when connected, varies the resonant frequency. One end of capacitor CN is shown connected to the controller 30. If the connection to the controller 30 is an open circuit, then CN will not affect the resonant frequency. If a connection to the reference ground 48 is provided, then capacitor CN and capacitor CO together determine the capacitive part of the resonant circuit and the resonant circuit impedance ZR. Being able to change the resonant frequency is advantageous to prevent the occupant detection system from radiating an electric field at certain frequencies, or to change the resonant frequency in response to detecting radio frequency type interference from some external source. Radio frequency interference may be detected by monitoring the network signal 22 when the excitation signal 28 is not activated, or by determining that an anomalous reading was observed when the resonant frequency is being determined.

FIG. 3 shows the controller 30 coupled to the resonant circuit formed by the electrical network 24 and the electrode/ occupant model 46 expressing the electrical impedance of the electrode 20. The controller 30 is configured to determine the resonant frequency of the resonant circuit, and thereby detect the presence of an occupant 12 based on the resonant frequency of the resonant circuit. The controller 30 may suitably include a signal generator 52 to output the excitation signal 28 at an excitation signal frequency. The excitation signal may be a sinusoidal voltage according to one embodiment. A voltage divider network is formed by the arrangement of a module impedance ZM and the resonant circuit impedance ZR. In response to the excitation signal 28, the network signal 22 is measured by a voltage detector 54. Voltage detector 54 suitably measures a network signal magnitude. Processor 50 is configured to vary the excitation signal using signal generator 52 to determine the resonant frequency by determining the excitation signal frequency that corresponds to a peak or maximum network signal magnitude. Processor 50 may be a commercially available microprocessor, or may be a commercially available digital signal processor that includes the signal generator 52 and voltage detector 54 blocks. the controller 30 may employ other control circuitry according to other embodiments/

Module impedance ZM is preferably provided by a capacitor CM. A suitable value for capacitor CM is 100 pF. If capacitor CM is too large or too small, the voltage divider ratio of impedances ZM and ZR will be such that the sensitivity of the network signal magnitude near the resonant frequency will be reduced. Capacitors around 100 pF having electrical characteristics that are stable over time and temperature are readily available and economical.

Figure 4:
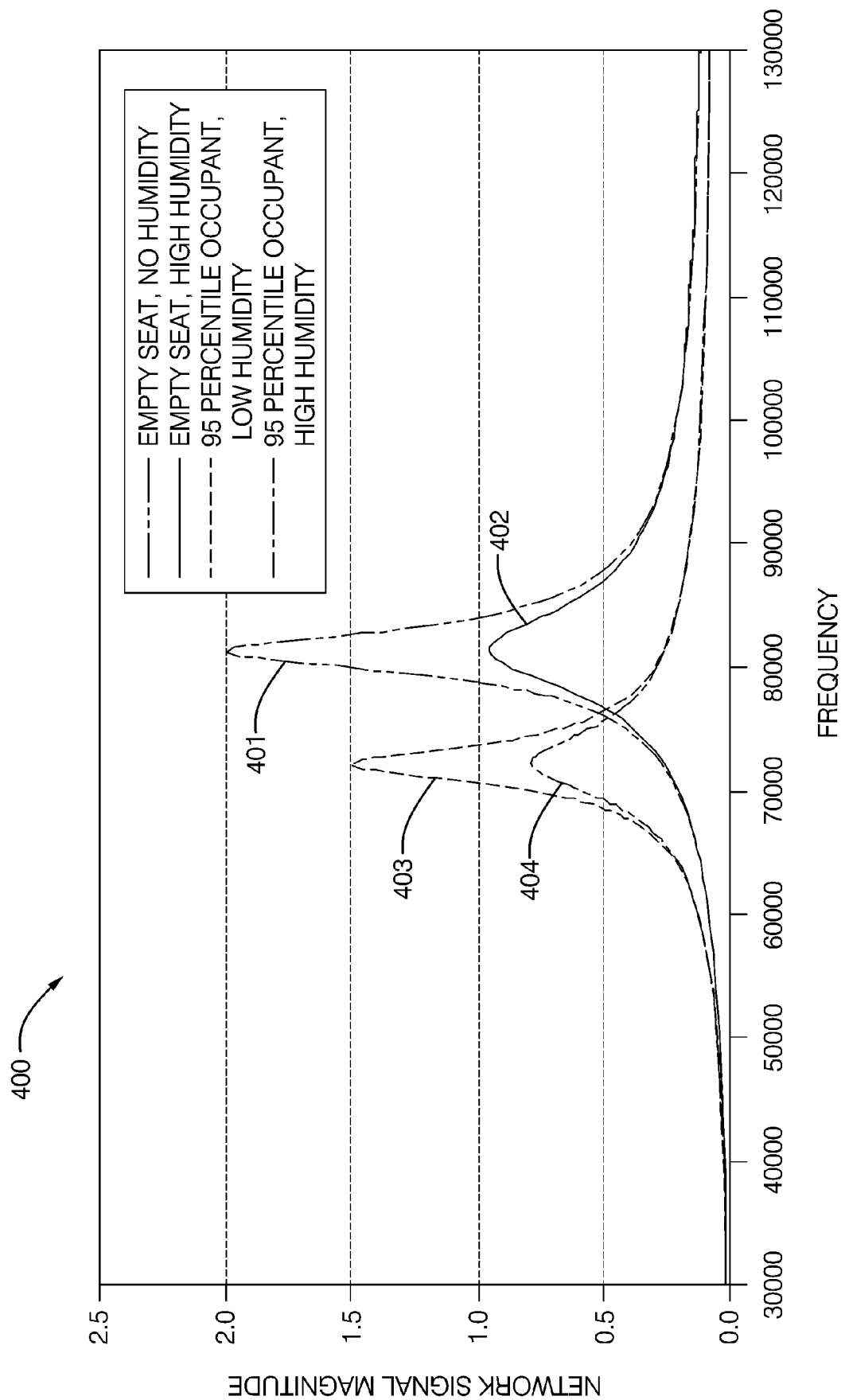
FIG. 4 is a graph of sensed voltage signals detected by the controller in FIG. 3.

FIG. 4 shows a graph 400 indicating frequency response curves for various seat occupancy and environmental conditions. Each curve shows the magnitude values of a network signal 22 from an exemplary occupant detection system 10 for a seat occupancy and environmental condition. The magnitude values are based on a measured voltage, but may alternately be based on a binary number from processor 50. The controller 30 is configured to vary the excitation frequency, measure the network signal magnitude, and determine the resonant frequency and the environmental condition based on the peak or maximum network signal magnitude. Curve 401 is an exemplary frequency response curve when seat assembly 32 is empty or unoccupied and the humidity level is low, such as less than 30% relative humidity for example. Curve 402 is an exemplary frequency response curve when seat assembly 32 is empty or unoccupied and the humidity level is high, such as greater than 90% relative humidity for example. At low humidity, resistor RH is relatively high, so the Q or quality factor of the resonant circuit at low humidity conditions is higher than the Q of the resonant circuit during high humidity conditions. Thus, the magnitude of the network signal at the resonant frequency is an indicator of the environmental condition of relative humidity. Curve 401 and curve 402 show a resonant frequency of about 82 kHz It is noted that the change in humidity levels has little effect on the resonant frequency.

Curve 403 is an exemplary frequency response curve when seat assembly 32 is occupied by a person whose size is characterized as being in the $95^{th}$ percentile of adults, and the humidity level is low. Being in the $95^{th}$ percentile means that 95% of all adults are smaller in size than the person in question, where size is based on the volume, surface area, or weight of the person. Curve 404 is an exemplary frequency response curve when seat assembly 32 is occupied by a person whose size is characterized as being in the $95^{th}$ percentile of adults, and the humidity level is high. Curve 403 and curve 404 show a resonant frequency of about 72 kHz. Comparing change in resonant frequency of curves 401 and 402 to the resonant frequency of curves 403 and 404 shows that the presence of an occupant in the seat assembly 32 is indicated by the resonant frequency and is relatively independent of humidity.

As the peak magnitude of the network signal 22 decreases with increasing humidity, the resonant frequency becomes less pronounced and the frequency response curves flatten. A wet seat may cause the frequency response curve to flatten to such a degree that it is difficult to determine the resonant frequency. As such, it is advantageous if the controller 30 is also configured to determine a wet seat fault condition based on the network signal magnitude being less than a threshold, such as 0.5V for example. According to one example, the threshold is determined empirically for a given seat/vehicle/electrode configuration.

Figure 5:
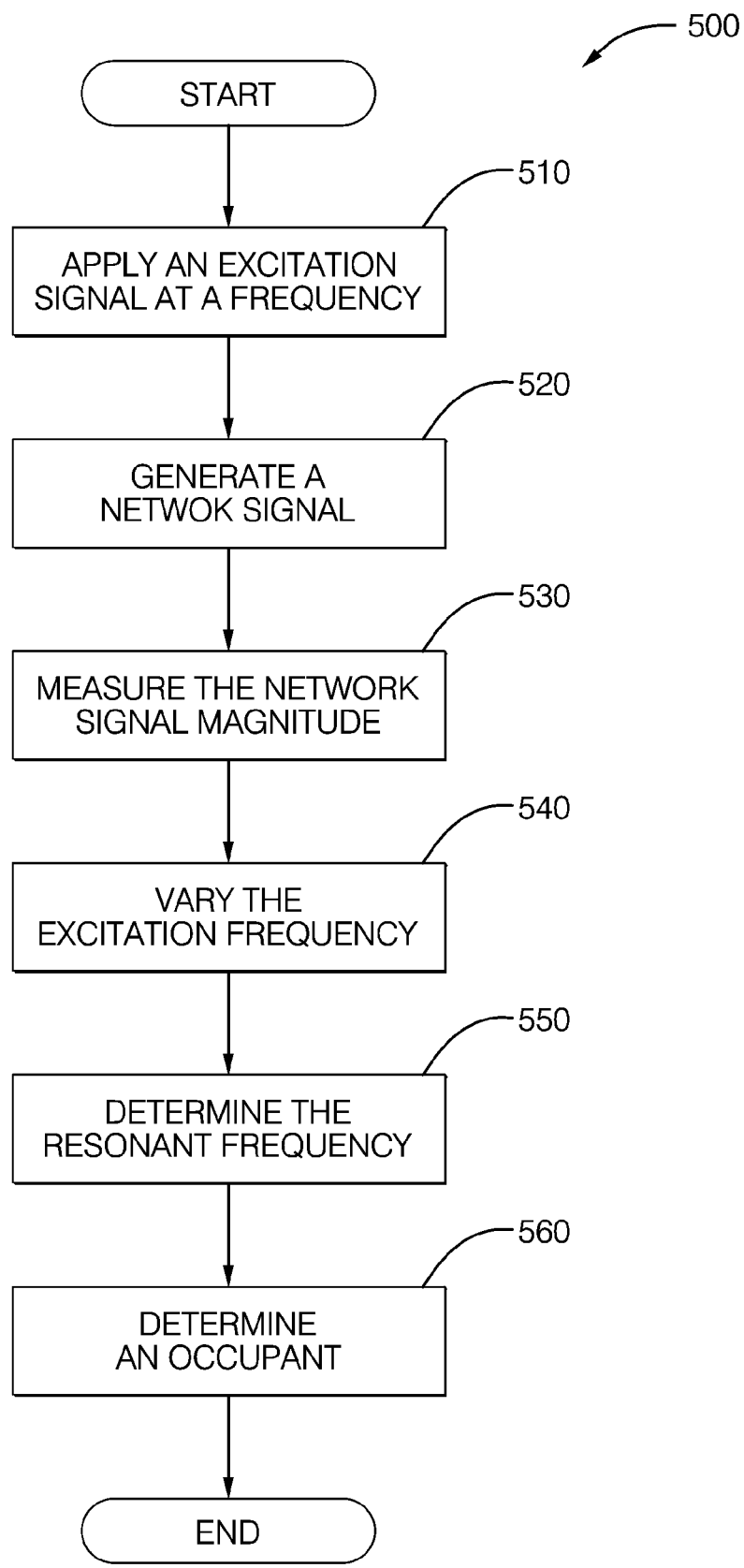
FIG. 5 is a flowchart of a method of detecting an occupant used by the system in FIG. 1.

FIG. 5 is a flowchart 500 showing an embodiment of a method of operating the occupant detection system 10 to detect the presence of an occupant. The occupant detection system has an electrode that has an electrode impedance indicative of an occupant, and an electrical network coupled the electrode to form a resonant circuit having a resonant frequency indicative of the electrode impedance. At step 510, controller 30 applies an excitation signal having an excitation frequency to the resonant circuit. The excitation signal may be a sinusoidal signal, according to one embodiment, since such a signal simplifies determining a resonant frequency. At step 520 the resonant circuit generates a network signal in response to the excitation signal. The network signal has a network signal magnitude dependent on the resonant frequency of the resonant circuit. At step 530, controller 30 measures the network signal magnitude. The network signal magnitude is preferably based on a root-mean-square (RMS) value of the network signal. Alternately, the network signal magnitude may be based on a simple average value, or a peak-to-peak value. At step 540 controller 30 varies the excitation frequency to generate another network signal so another network signal magnitude can be measured. The excitation frequency may be varied by selecting frequencies from a list or may be determined using an algorithm. The excitation frequency may also be selected based on previous excitation frequencies and/or a previously determined resonant frequency. Once a series of network signal magnitudes are measured, the controller 30 determines the resonant frequency based on the network signal magnitude for each frequency. At step 560, controller 30 determines an occupant based on the resonant frequency.

Another embodiment of a method of operating the occupant detection system 10 may include determining the activation status of an air bag module based on determining the occupant. Controller 30 outputs an activation signal 13 to the air bag module 14 for controlling the activation status of the air bag module 14. If the occupant detection system 10 determines that the seat assembly 32 is empty, then the air bag module may be deactivated to prevent unnecessary deployment of the air bag 16. If an occupant of sufficient size is detected in the seat assembly 32, then the air bag module may be activated so that if a collision is detected the air bag 16 may be deployed to protect the occupant 12.

Another embodiment of a method of operating the occupant detection system 10 may include changing the electrical network capacitance part to reduce signal interference. If an electromagnetic signal is present around the electrode 20, the electromagnetic signal may interfere with the controller 30 determining the resonant frequency. The presence of the electromagnetic signal may be determined by configuring the controller 30 to receive signals from the electrode 20 when no excitation signal is being output. By changing the electrical network capacitance part, for example by adding capacitor CN to the resonant circuit, the resonant frequency can be shifted to avoid interference from the electromagnetic signal.

Another embodiment of a method of operating the occupant detection system 10 may include the controller 30 initially selecting an excitation frequency range and an excitation frequency step parameter for detecting an occupant presence. The excitation frequency range needs to be large enough to generate excitation signals at frequencies above and below the resonant frequency. The excitation frequency step parameter may change the excitation frequency a greater amount if the excitation frequency is not near an expected resonant frequency, and make smaller changes near the expected resonant frequency. Making small changes near the expected resonant frequency may be useful when humidity is high or the seat assembly 32 is wet which causes the resonant frequency to be less pronounced. The selections of range and step parameter, or step size, may be based on either predetermined values or values saved from a previous time of operation. The controller outputs a plurality of excitation signals based on the excitation frequency range and the excitation frequency step parameter. The controller 30 measures a network signal magnitude arising from each excitation signal at each of the plurality of frequencies. The controller 30 determines a resonant frequency by determining which of the plurality of excitation signal frequencies results in a maximum network signal magnitude. An occupant presence can then be determined based on the resonant frequency. Determining an occupant presence may include determining the size or classification of the occupant. The size or classification may be used to indicate an appropriate deployment force to the air bag module 14. The process of varying the excitation frequency to determine a resonant frequency may be repeated on a periodic basis, once every 10 seconds for example. By repeatedly determining a resonant frequency, the occupant detection system 10 may increase a confidence factor that an occupant has been accurately classified and detect if the occupant 12 shifts to a position that may not be optimum to protect the occupant if the air bag 16 was deployed. Also, the excitation frequency range and the excitation frequency step parameter may be adjusted more optimally the for performing another subsequent occupant detection based on one or more prior resonant frequency determinations, the occupants classification and/or a determination of an environmental condition such as humidity or that the seat is wet.

While this invention has been described in terms of the preferred embodiments thereof, it is not intended to be so limited, but rather only to the extent set forth in the claims that follow.

We claim:

1. An occupant detection system comprising:
   an electrode arranged proximate to an expected location of an occupant for generating an electric field between the electrode and the occupant proximate thereto;
   an electrical network coupled to the electrode to form a resonant circuit that includes the occupant as part of the resonant circuit; and
   a controller coupled to the resonant circuit, said controller configured to determine a resonant frequency of the resonant circuit indicative of an occupant presence, and determine a network signal magnitude at the resonant frequency indicative of a humidity value proximate to the electrode by
   applying an excitation signal to a resonant circuit that includes the occupant as part of the resonant circuit, said excitation signal having an excitation frequency,
   detecting a network signal arising in response to the excitation signal, said network signal having a network signal magnitude,
   determining a resonant frequency corresponding to the excitation frequency that causes a peak network signal magnitude, and
   determining a humidity value based on the network signal magnitude at the resonant frequency.

2. The occupant detection system in accordance with claim 1, wherein said electrode is adjacent a seating surface of a vehicle seat to sense the occupant seated in the vehicle seat.

3. The occupant detection system in accordance with claim 1, wherein said controller includes a signal generator coupled to the resonant circuit and configured to output an excitation signal having an excitation frequency, and a voltage detector arranged to measure the network signal magnitude in response to the excitation signal.

4. The occupant detection system in accordance with claim 3, wherein said controller is configured to vary the excitation frequency and measure the network signal magnitude to determine the resonant frequency and the humidity value.

5. The occupant detection system in accordance with claim 1, wherein said controller is configured to determine a wet seat fault condition if the network signal magnitude at the resonant frequency is less than a threshold.

6. The occupant detection system in accordance with claim 1, wherein said electrical network includes a network capacitance part operable to change a capacitance value of the network capacitance part effective to change the resonant frequency of the resonant circuit.

7. A method for detecting a vehicle occupant comprising the steps of:
   applying an excitation signal to a resonant circuit that includes the occupant as part of the resonant circuit, said excitation signal having an excitation frequency;
   detecting a network signal arising in response to the excitation signal, said network signal having a network signal magnitude;
   determining a resonant frequency corresponding to the excitation frequency that causes a peak network signal magnitude; and
   determining a humidity value based on the network signal magnitude at the resonant frequency.

8. The method in accordance with claim 7, wherein the method further comprises determining a wet seat fault condition if the network signal magnitude at the resonant frequency is below a threshold.

* * * * *